United States Patent [19]

Colbert

[11] Patent Number: 4,942,692
[45] Date of Patent: Jul. 24, 1990

[54] WIRE FRAME FOR LIVING PLANT WREATH

[76] Inventor: Mary T. Colbert, 187 Homewood Rd., Los Angeles, Calif. 90049

[21] Appl. No.: 297,252

[22] Filed: Jan. 17, 1989

[51] Int. Cl.⁵ .............................. A01G 5/00
[52] U.S. Cl. ..................... 47/41.12; 47/79; 248/27.8; 428/10
[58] Field of Search ............... 47/41.12, 79; 248/27.8; 428/10

[56] References Cited

U.S. PATENT DOCUMENTS

| | | | |
|---|---|---|---|
| 79,122 | 6/1868 | Hochbrann | 47/41.12 |
| 1,225,767 | 5/1917 | Casteris | 47/41.12 |
| 1,594,592 | 8/1926 | Biram | 47/41.12 |
| 1,631,631 | 6/1927 | Gerlinger | 47/41.12 |
| 1,657,750 | 1/1928 | Hanson | 428/10 |
| 1,692,221 | 12/1928 | Tabbs | 428/10 |
| 3,047,981 | 8/1962 | Shape | 47/41.12 |
| 3,050,890 | 8/1962 | Bloch | 428/10 |
| 4,060,934 | 12/1977 | Skaggs | 47/79 |
| 4,803,806 | 2/1989 | Ito | 248/27.8 |

FOREIGN PATENT DOCUMENTS

| | | | |
|---|---|---|---|
| 2750670 | 11/1976 | Fed. Rep. of Germany | 47/41.12 |
| 23573 | 4/1901 | Switzerland | 47/41.12 |
| 1400409 | 7/1975 | United Kingdom | 248/27.8 |

OTHER PUBLICATIONS

"Plant Containers You Can Make", ©1976, Lane Publishing Co., pp. 18 and 19.

Primary Examiner—Henry E. Raduazo
Attorney, Agent, or Firm—William H. Pavitt, Jr.; Ralf H. Siegemund; Daniel L. Dawes

[57] ABSTRACT

A wire frame for supporting a living plant wreath is made of three pairs of concentric wire rings, each pair with an inner and outer ring, the three pairs stacked in three parallel planes and interconnected by welded wire ribs to make up a structurally rigid unitary toroidal wire frame. Optionally a number of candle holders made of coiled wire are welded spaced circumferentially on the frame, also structurally reinforcing the toroidal frame. A method for constructing a living plant wreath using a kit of parts including the wire frame is described. The kit may include a drip bag for irrigating a living wreath at a controlled rate.

6 Claims, 3 Drawing Sheets

WIRE FRAME FOR LIVING PLANT WREATH

BACKGROUND OF THE INVENTION

1. FIELD OF THE INVENTION

The present invention pertains generally to the field of gardening implements and equipment and more particularly relates to an improved one-piece annular wire frame for supporting a living plant wreath.

2. STATE OF THE PRIOR ART

It is known in the gardening and ornamental plant trade to assemble a living plant wreath by filling a wire frame with soil, and wrapping the soil filled frame with moss into which holes can be punched for planting seedlings or plant cuttings. The resulting assembly can be hung from a ceiling or on a vertical surface such as a wall or a door as a decorative wreath and many attractive living plant and flower arrangements can be maintained on such a base for relatively long periods of time ranging up to several years.

The wire frame used by this applicant in the past consisted of two ring shaped half-frames which were joined together to form a donut or toroidal shape, i.e. an upper and a lower half was required to assemble a single closed frame. Each half had a U-shaped cross-section, i.e. was open on one side and the two open sides joined to form a single closed frame as illustrated in FIGS. 1 and 1A of the attached drawings. The two halves of the annular frame were bound together with wire loops which, it was found, tended to rust and break under the corrosive influence of the moist soil with which the frame was packed. Upon breaking the wire loops would allow the two frame piece to separate, damaging or destroying the wreath.

For these and other reasons of convenience, simplicity and economy it was found desirable to provide an improved wire frame which would eliminate these and other difficulties of the previously used design.

SUMMARY OF THE INVENTION

In response to the aforementioned need an improved wire frame for supporting a living plant wreath is disclosed which has upper and lower pairs of generally concentric wire rings, an intermediate pair of generally concentric wire rings, and a number of wire ribs welded to both rings of the intermediate pair and circumferentially spaced apart along the rings. The ribs are also welded alternately to both rings of the upper pair or the lower pair, thereby providing a structurally rigid unitary toroidal wire frame. The ribs are generally U-shaped having two ends welded to the intermediate ring pair and an intermediate rib portion welded to either the upper or the lower pairs. The frame may further include a number of candle holders spaced circumferentially on the frame, each holder including a coiled wire segment for receiving and supporting the base of a candle and an extended wire segment welded to one ring in each of the upper and lower pairs for supporting the coiled segment and also structurally reinforcing the toroidal frame. Each said candle holder may be comprised of a single length of wire.

A living plant wreath is made with the novel wire frame by providing a generally toroidal wire frame as disclosed herein; substantially filling the frame with potting soil; wrapping the frame in moist sphagnum moss to contain the soil in said frame; propagating plant cuttings into the soil through holes in the moss wrapping; and optionally for vertical hanging wreath, attaching a drip bag through a connecting tube for dispensing water from the bag into the soil, the drip bag including a thumb adjustable valve for constricting the tube thereby to regulate the drip rate of water into the soil. The drip bag, connecting tube and valve are all part of a medical intravenous drip bag.

A kit for making and sustaining a living plant wreath may be assembled which includes a generally toroidal wire frame as disclosed herein; a spool of coiled copper wire to secure the soil-filled moss wrap around the frame; and a medical force feeding drip bag of the type having a connecting tube preferably with a thumb adjustable valve for constricting the tube, for dripping water from the bag into the soil at a drip rate adjustable by the valve, thereby to sustain plant cuttings propagated into the soil. The kit may optionally include loose potting soil sufficient for substantially filling the frame; dry sphagnum moss for wrapping the frame so as to contain the soil in the frame; S-shaped head fern pins for securing plant cuttings to the soil filled frame; wreath hanging hardware including a length of jack chain with two "S" hooks to suspend the finished frame on a vertical surface; and a toroidal half-frame for use as a base on a horizontal surface for aeration of the living wreath.

DETAILED DESCRIPTION OF THE PREFERRED EMBODIMENTS

Figure 1:
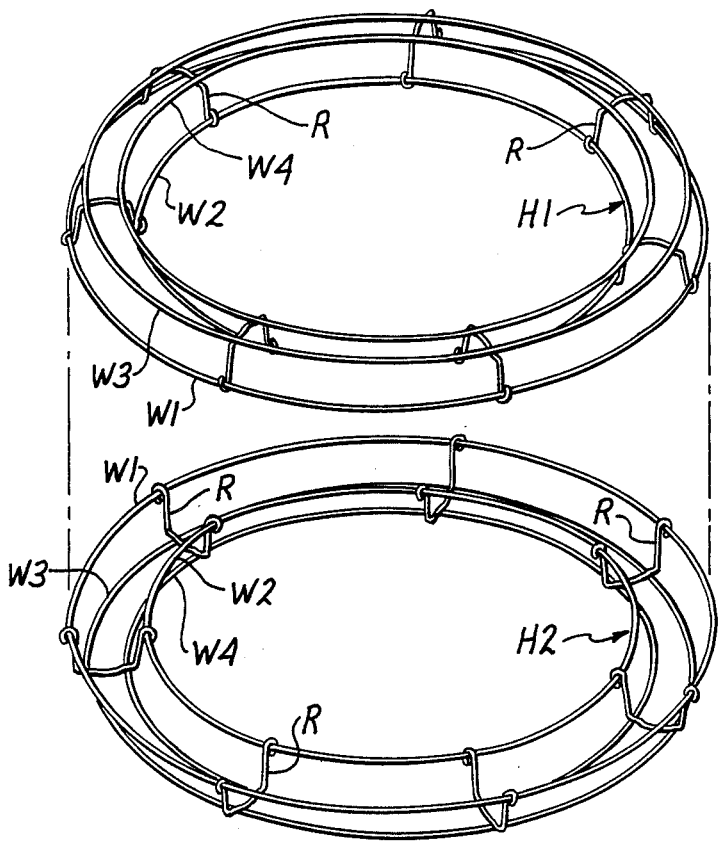
FIG. 1 is a perspective view showing the prior art wherein two annular half frames are joined to make up a donut shaped wire frame.
Figure 1A:
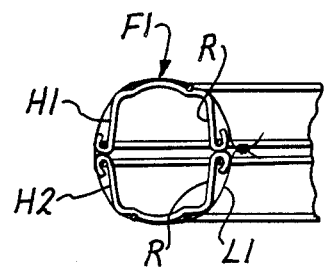
FIG. 1A is a fragmentary radial cross-section of a donut shaped wire frame of the prior art showing the two halves bound together with a wire loop.

With reference to the drawings, FIG. 1 shows the prior art wherein two separate halves H1 and H2 were needed to make up a complete wire frame W1 having the closed cross-section shown in FIG. 1A, the two halves being bound together by several circumferentially spaced copper wire fastenings such as the single loop L1 shown in the drawing. Each of the two frame halves H1 and H2 is fashioned of four wire rings held together by circumferentially spaced ribs R. In making up a complete frame F1 the halves H1 and H2 comprised a total of 8 wire rings W1–W4.

Figure 2:
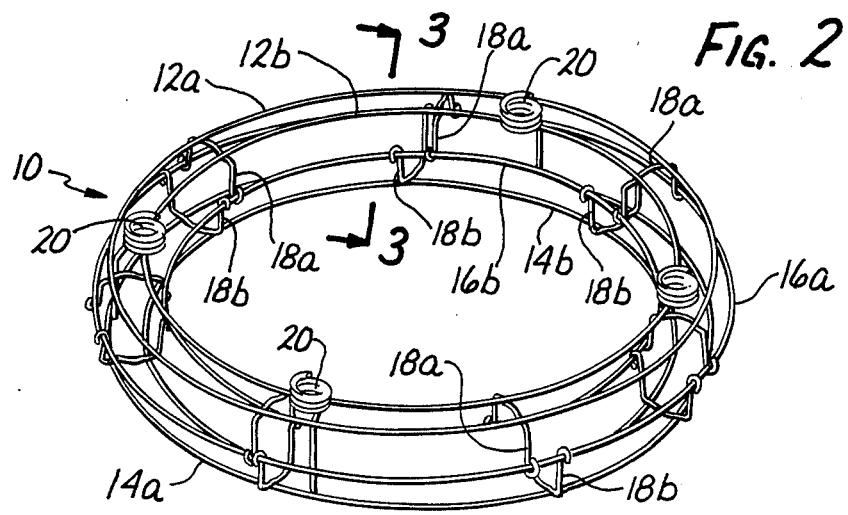
FIG. 2 is a perspective view of an improved, one piece toroidal wire frame according to the present invention.

The improved unitary toroidal frame 10 of this invention is illustrated in FIG. 2, where the toroidal frame 10 is made up of only six generally concentric wire rings arranged in three pairs including an upper pair of wires 12a, 12b, a lower pair of wires 14a, 14b and an intermediate pair of wires 16a and 16b. Each pair of wires lies within a common plane the three imaginary planes occupied by the three wire ring pairs being stacked one over the other. Each ring pair has an inner wire ring denoted by the lower case letter b and an outer wire ring denoted by the lower case letter a.

The six wire rings are held together and supported in the aforedescribed spatial relationship by means of circumferentially spaced wire ribs 18a and 18b. All the ribs have a similar U-shape but differ in that one set of ribs identified by the lower case a interconnects the upper ring pair 12a, 12b with the intermediate wire ring pair 16a, 16b while the ribs 18b interconnect the lower ring pair 14a, 14b with the intermediate ring pair 16a, 16b. The upper ribs 18a and lower ribs 18b alternate with each other along the circumference of the frame. The resulting frame 10 is unitary, and does not require assembly nor wire ties L1 as in FIG. 1a, saving time and labor to the user and furthermore is more economical to manufacture because two wire rings W1, W4 are eliminated over the prior art frame.

Figure 3:
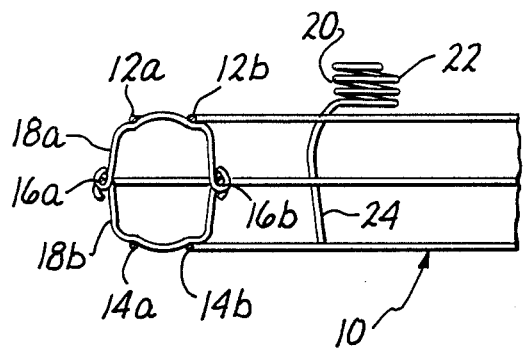
FIG. 3 is a fragmentary radial section of the improved wire frame of FIG. 2.
Figure 4:
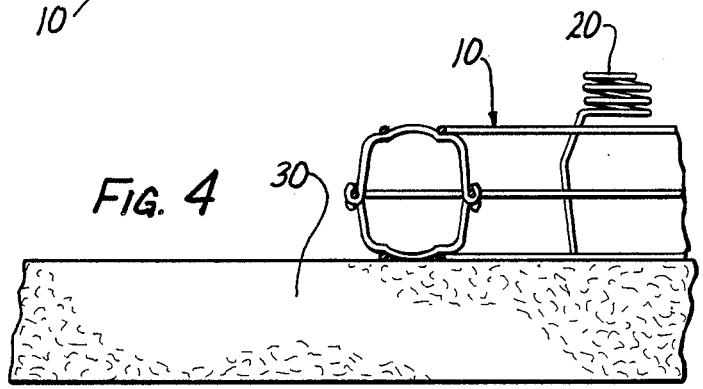
FIG. 4 illustrates a first step in the building of a living plant wreath using the improved wire frame by placing the frame on a of moist sphagnum moss.
Figure 5:
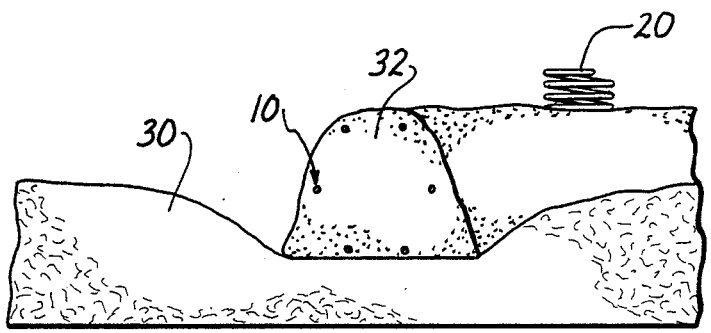
FIG. 5 shows a subsequent step wherein the wire frame is filled with a plant sustaining medium such as potting soil.
Figure 6:
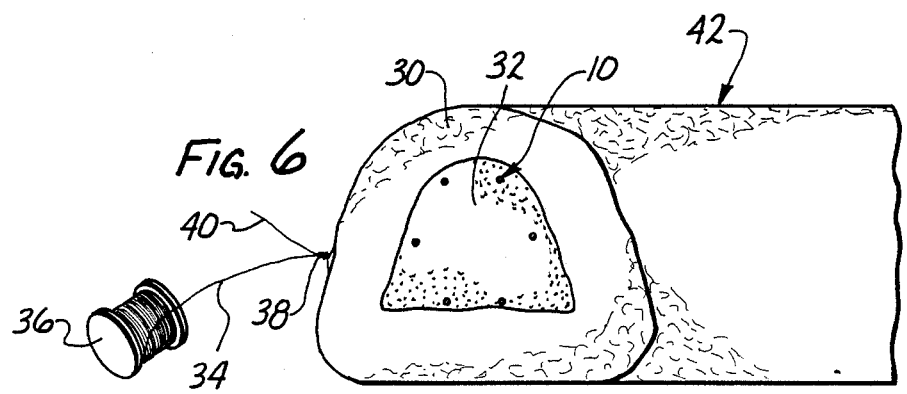
FIG. 6 shows the medium filled wire frame wrapped in the sheet of moist sphagnum moss which is tied in place with wire.
Figure 7:
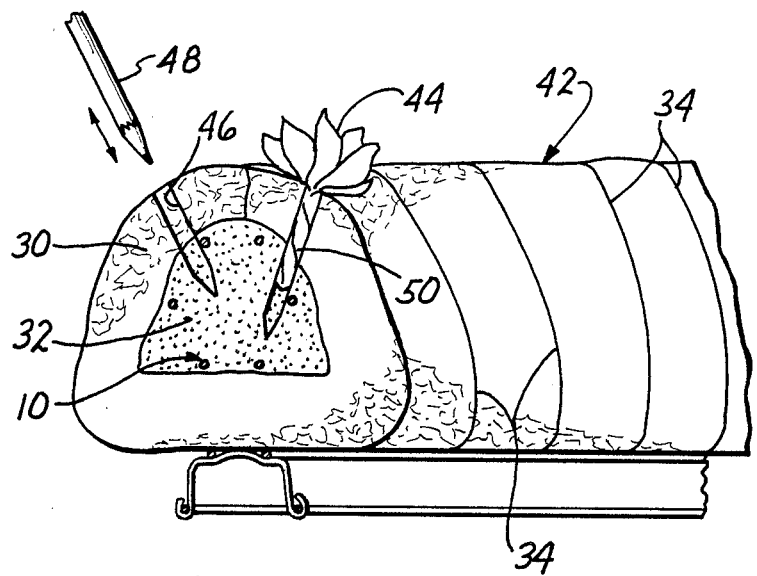
FIG. 7 shows plant cuttings being propagated into the filled and wrapped frame of FIG. 6.

A further improvement in the frame 10 is the optional inclusion of candle holder elements 20, several of which may be spaced around the frame 10. Each candle holder element 20 is made up of a single length of wire similar to that used for the construction of the remainder of the frame 10, one portion of the wire segment being coiled as best seen in the cross-sections of FIGS. 3–5 to make up a candle receiving base 22, another segment 24 of the candle holder 20 being extended and secured as by welding to one of the upper and one of the lower wire rings, either the inner or outer of these. In the illustrated example, the extended wire segment 24 of the candle holder 20 is welded to the outer rings 12a and 14a of the upper and lower wire ring pairs respectively, thus substantially improving the overall structural strength and rigidity of the toroidal frame assembly 10 in a simple and convenient manner while simultaneously providing a means for supporting candles on the ornamental wreath.

The building of a living plant wreath using the improved wire frame 10 will now be described in connection with FIGS. 4 through 8.

A quantity of spagnum moss is soaked for several hours with water, drained and spread evenly into a circular mat 30 approximately three times the diameter of the wreath frame 10. A sufficient quantity of soil 32 is mixed with water to a fairly thick consistency such that it holds its shape. The wire frame 10 is then centered on top of the moss mat 30, as suggested in FIG. 4, and moist potting soil is placed on the wire frame until it covers the top of the frame. The moist soil is mounded along the entire circumference of the frame until it takes on the appearance of a chocolate angel food cake as in FIG. 5. The moss mat 30 is folded in small sections, beginning from the outside edge of the mat, over the top of the sail core 32. At the same time, an oposite portion of the moss mat 30 is lifted from the center towards the outer portion. The two moss sections are brought together to cover a seetion of the soil core 32. The end of a small gauge copper wire 34 on a spool 36 is slipped from the outside of the frame under the moss mat towards the center. The wire end is pulled up from the inside of the frame, wrapped over the moss covered portion of the core and joined with the wire on the outside connected to the spool. The moss covering is secured to the soil covered frame by firmly twisting these two wire portions together as at 38 in FIG. 6. It is desirable to leave a conspicuous "tail" 40 of wire to mark the beginning point of the base building process. The copper wire from the spool 34 is then coiled around the wreath base 42 at approximately 1½ inch intervals measured along the outside edge of the frame. The last coil of the wire 32 should be joined to the "tai" 40 marking the beginning with a few twists of wire.

The completed base 42 may be hung on a vertical surface from a hanging chain connected by means of two S-hooks attached to two spaced apart ribs 18a or 18b.

In the alternative, the wreath may be suspended as a candelabrum, particularly when candles are to be placed on the wreath, by attaching four S-hooks at four circumferentially equidistant ribs 18a on the frame 10 and hanging the four chains from a suitable support or a common tie point suspended from the ceiling.

A variety of plants 44 may be propagated onto the annular base 42 by punching small holes 46 with a pencil point 48 through the moss covering 30 and into the soil core 32. The stub 58 of the plant cutting is inserted into the hole 46 and where necessary may be secured to the wreath base with an S-shaped head fern pin pushed into the moss covering.

The candle holder elements 20 are easily hidden beneath the planting cuttings and usually will not be visible even when no candles are to be mounted on the frame thus making the planted wreath adaptable for horizontal use as either a centerpiece or a vertical wall wreath. It is therefore best to mark the positions of the candle holders with corks inserted into the candle holders or by other suitable markers before covering the base 40 with plants.

As the seedlings or cuttings grow on the wreath base it is desirable to turn the base a quarter turn, when the wreath is on a horizontal surface or suspended horizontally to keep the growth patterns and rate of growth as even as possible. This turning is facilitated by the use of a swivel hook.

When the living wreath is placed on a horizontal surface, it is desirable to support the toroidal frame on a toroidal half-frame H1 such as shown in FIG. 1 of the drawings which allows free circulation of air around and underneath the wreath for aeration of the plants and soil.

Because the soil core 32 and covering moss 30 are relatively fragile, and easily break apart or crumble in handling, it is highly desirable to provide maximum rigidity and integrity in the wire frame 10 as the supporting element.

In prior art frames assembled from two equal halves as illustrated in FIGS. 1 and 1A, the frame was more susceptible to disruption of the soil and moss core because of possible relative movement between the two wire pieces, unless great care was taken to firmly secure the two pieces with wire along their entire perimeter. Even then, since these wreaths can be maintained for periods of years, there was no assurance that the binding wire loops would not corrode or break over such periods of time. If that happens, the possibility of separation between the two wire wreaths arises and any significant such separation can create danger of substantial pieces of the soil and moss core breaking away, along with the plants supported on such pieces with consequent damage to the wreath. These difficulties are eliminated by the improved unitary wire base 10 here disclosed which not only cannot separate into two halves but can be provided with the candle holder elements 20 which also serve the dual function of significantly reinforcing the wire frame against distortion to thereby better support the soil core 32 and moss covering 30. The extended wire portions 24 of the candle holder also contribute as reinforcing bars extending through the soil core when the frame 10 is packed with potting soil.

Figure 8:
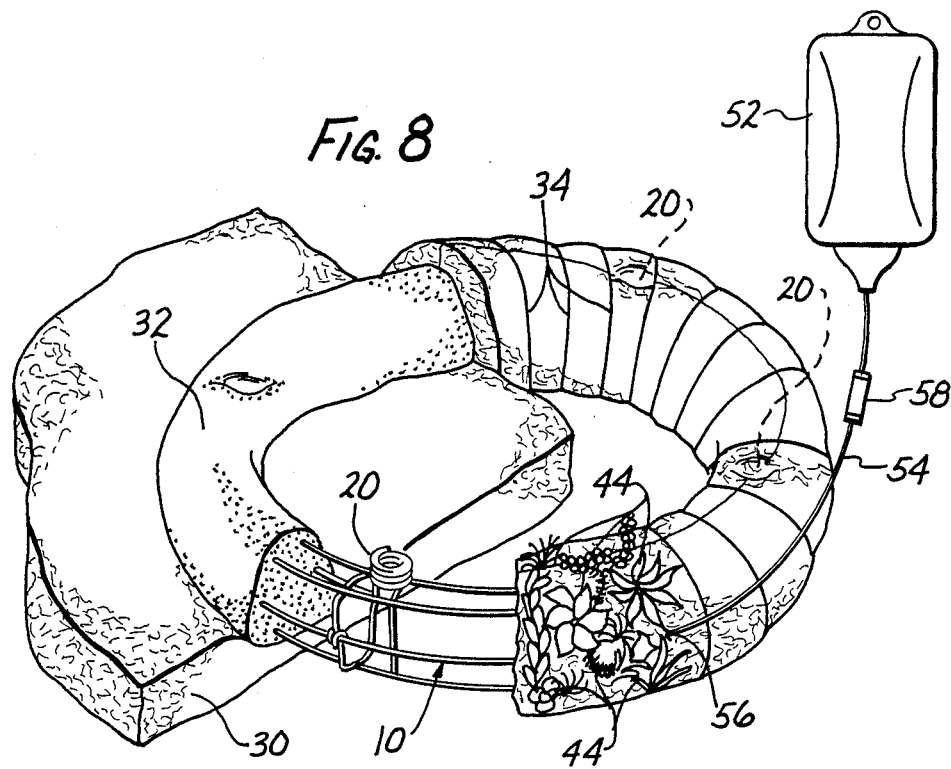
FIG. 8 shows a typical completed wreath broken away to show the various layers of the wreath structure which can be irrigated by a drip bottle connected through a tube with a drip rate control valve when the wreath is hung vertically.

Wreath maintenance may be expedited by providing an efficient and convenient drip irrigation system shown in FIG. 8 which greatly facilitates the problem of irrigating indoor wreaths suspended on walls, doors or over furniture or rugs. Since no water tight container exists in the wreath, even a slight excess of water will drip onto the underlying floor or furniture. Measuring the exact amount of water needed to consistently and adequately moisten the soil core without dripping is for all practical purposes too difficult, at least without a fair amount of experimentation.

This problem is alleviated by a drip bag 52 of the type commonly used in the medical field for the purpose of administering forced feeding solutions, and which includes a plastic bag which in this case will be filled with water and optionally a soluble fertilizer or pesticide solution, a flexible plastic tube 54 connected to the bottom of the bag terminating in a hollow needle or equivalent stiff end tube 56 which may be inserted into the soil core of the hanging wreath. The drip bag is further provided with a control valve 58 mounted at an intermediate point on the flexible tube which has a thumb wheel adjustment whereby the flexible conduit tube can be constricted to a variable degree so as to effectively change its internal cross-section and thereby adjust the drip rate of the irrigation system. Such bags are commercially available but have not until now been used for this particular application nor are such medical drip bags sold for this purpose. It is found that by use of such a drip bag 52 water, fertilizer and/or systemic pesticide solutions are equally distributed and effectively applied throughout the annular soil core 32 without spillage or awkward watering of the hanging wreath. Gravity and the capillary action of the moss and soil helps to evenly distribute the fluid being administered by the drip irrigation system at rates which, however, vary depending on the wreath size, plant density and various other factors which should be compensated for by proper adjustment of the thumb wheel on the flow control valve.

The end of the feed tube 54 of the drip bag 52 should be inserted near the top of the wreath when it is hanging on a vertical surface and optimally two such bags 52 have been found best, each feeding one side of a hanging wreath equally and simultaneously.

While a preferred embodiment of the present invention has been shown and illustrated for purposes of clarity and example only, many changes, substitutions and modifications to the described embodiment will become apparent to those possessed of ordinary skill in the art without thereby departing from the spirit and scope of the present invention which is defined only by the following claims.

What is claimed is:

1. An improved wire frame for supporting a festive wreath of living plant, comprising:

upper and lower pairs of generally concentric wire rings;

an intermediate pair of generally concentric wire rings;

a plurality of wire ribs circumferentially spaced apart along said rings and welded to both rings of said intermediate pair;

said ribs also being welded alternately to both rings of said upper pair or said lower pair, thereby to obtain a structurally rigid unitary toroidal wire frame; and a plurality of candle holders spaced circumferentially on said frame, each said holder comprised of a single length of wire including a coiled wire segment for receiving and supporting the base of a candle and an extended wire segment welded to one ring in each of said upper and lower pairs for supporting said coiled segment and also structurally reinforcing the toroidal frame.

2. The frame of claim 1 wherein said ribs are generally U-shaped having two ends welded to said intermediate pair and an intermediate rib portion welded to either said upper or said lower pairs.

3. An improved, generally toroidal, wire frame for supporting a festive wreath of living plant comprising:

upper and lower pairs of generally concentric wire rings, each pair positioned in a separate horizontal plane;

an intermediate pair of generally concentric wire rings, positioned in an intermediate horizontal plane;

a plurality of U-shaped wire ribs spaced apart along said rings, being welded near their ends to said intermediate rings and extending alternately upwardly and downwardly from the plane of said intermediate rings whereby to contact either said upper pair or said lower pair of rings, and said rings being welded to either said upper pair or lower pair rings at the contact points; the diameters of all said rings being so related that said six rings are located generally at the corners of a hexagon located in a perpendicular diametric plane through said toroidal frame.

4. An improved wire frame for supporting a living plant wreath, comprising:

upper and lower pairs of generally concentric wire rings; an intermediate pair of generally concentric wire rings, positioned in an intermediate horizontal plane;

a plurality of wire ribs circumferentially spaced apart along said rings, welded to both rings of said intermediate pair, and also welded alternately to both rings of said upper pair or said lower pair, said ribs being generally U-shaped and having two rib ends welded to said intermediate pair and an intermediate rib portion welded to either said upper or said lower pair, thereby to obtain a structurally rigid unitary toroidal wire frame.

5. An improved wire frame for supporting a living plant wreath, comprising:

upper and lower pairs of generally concentric wire rings;

an intermediate pair of generally concentric wire rings; and a plurality of wire ribs circumferentially spaced apart along said rings, welded to both rings of said intermediate pair and also welded alternately to both rings of said upper pair or said lower pair, said ribs being generally U-shaped and having two rib ends welded to said intermediate pair and an intermediate rib portion welded to either said upper or said lower pair; and a plurality of candle holders spaced circumferentially on said frame, each said holder including a coiled wire segment for receiving and supporting the base of a candle and an extended wire segment welded to one ring in each of said upper and lower pairs for supporting said coiled segment and also structurally reinforcing the toroidal frame thereby to obtain a structurally rigid unitary toroidal wire frame.

6. An improved wire frame for supporting a living plant wreath, comprising:

upper and lower pairs of generally concentric wire rings;

an intermediate pair of generally concentric wire rings;

a plurality of wire ribs circumferentially spaced apart along said rings, welded to both rings of said intermediate pair; and also welded alternately to both rings of said upper pair or said lower pair; said ribs being generally U-shaped and having two rib ends welded to said intermediate pair and an intermediate rib portion welded to either said upper or said lower pair; and a plurality of candle holders spaced circumferentially on said frame, each said holder composed of a single length of wire having a coiled upper end segment for receiving and supporting the base of a candle and a downwardly extending single wire segment welded to one of the rings in each of said upper and lower pairs for supporting said coiled segment and also structurally reinforcing the toroidal frame.

* * * * *